(No Model.)
S. P. ETTER.
WIRE FENCE.
No. 358,852. Patented Mar. 8, 1887.
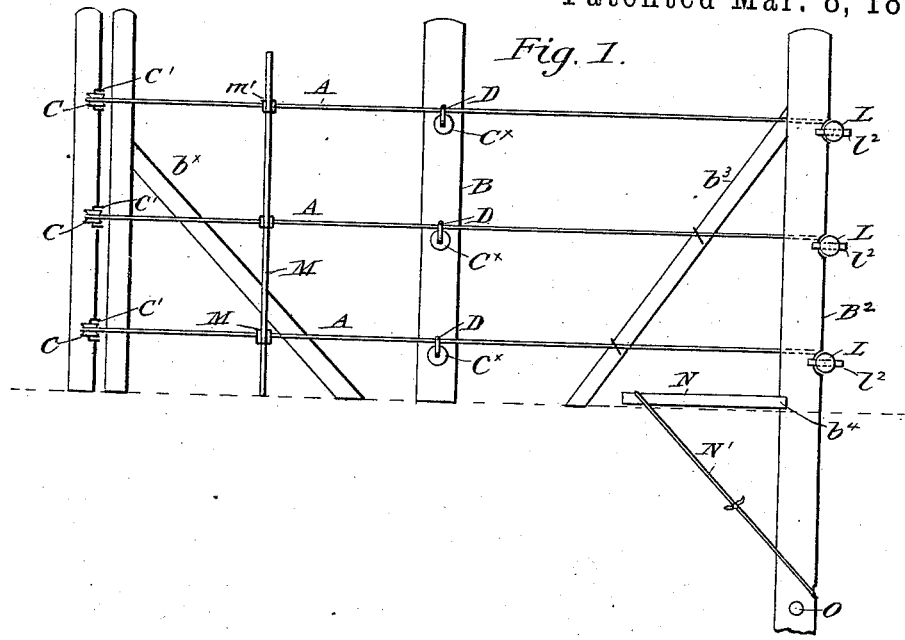
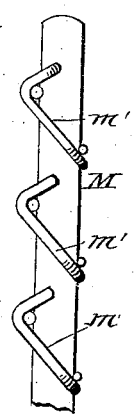
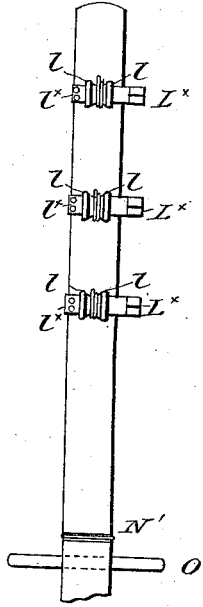
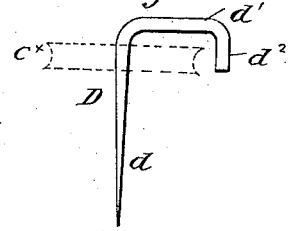
Witnesses.
Norris A. Clark
O. S. Buhrman.
Inventor
Saml. P. Etter,
By J. N. Kalb,
His Attorney.

UNITED STATES PATENT OFFICE.

SAMUEL P. ETTER, OF CEDARTOWN, GEORGIA.

WIRE FENCE.

SPECIFICATION forming part of Letters Patent No. 358,852, dated March 8, 1887.

Application filed June 28, 1886. Serial No. 206,555. (No model.)

*To all whom it may concern:*

Be it known that I, SAMUEL P. ETTER, a citizen of the United States, residing at Cedartown, in the county of Polk and State of Georgia, have invented certain new and useful Improvements in Wire Fences; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to wire fences, and has for its object the production of a simple and efficient fence, secure and reliable, and easily stretched and firmly held.

I provide rollers or pulleys over which the wires are drawn. These may be placed on every post or at intervals, as may be desired. On corner-posts they are preferably placed with their axes in a vertical position and the wires drawn over them, while on posts which the wires pass on a right line the pulleys or rollers have their axes on a horizontal line. The former manner of placing the rollers admits of the use of an ordinary flat-top staple, while with the latter manner of mounting them I employ a hook, which will hereinafter be explained and described. This hook serves the twofold purpose of forming an axis for the pulley or roller and a binding or guarding means for the wire. I provide a means for securing the wires at one or both ends of a section, which serves the purpose also of a stretching or tightening means. This consists of a roller with annular ribs which work in depressions in the post and prevent the roller from sliding or slipping endwise, while the space or depression on the roller between these ribs furnishes a winding-drum for the wire and prevents the roller from slipping through the wire coiled round it. Holes bored diametrically through the roller, near one end or both, permit the insertion of a holding pin or pins, which pass through the roller and enter the wood or metal of the post in openings provided for that purpose. One end of these rollers is provided with a head or other means for being engaged by a tool to effect the turning of the roller. I also provide a stiffening-bar or supplemental intermediate post between the planted posts of the fence to stiffen and support the wires. This bar is preferably made flat with notches or openings in one edge, in which the wires of the fence rest, and binding-wires passed through the post above each fence-wire are each bent over the fence-wire and carried round to the opposite edge of the bar, where the ends are twisted or otherwise connected together. The bottom of the stiffening-bar will rest directly or indirectly upon the surface of the ground, so as to prevent the fence from sagging between the posts. The corner-post will be provided with a brace set at an angle of about forty-five degrees to take the strain of said post. The end post of each section or any intermediate post, if desired, is provided with a bracing means consisting of a horizontal plate or strip let under one edge of the post and extending out on top of the soil, and a tying means or strap of wire connecting the outer end of said strip with the post at a suitable point down its length beneath the ground. The lower ends of the posts, either at the end of a section or at any intermediate point, or on all of the planted posts, may be provided with an anchor or cross-pin to give them a firmer foundation in the soil.

The following detailed description by figures and letters will more fully explain the nature of my said invention and the manner in which I proceed to build and apply the same.

The accompanying drawings illustrate what I consider the best means for carrying my invention into practice.

Figure 1 is a front elevation of the fence. Fig. 2 is a side elevation of the stiffening-post; Fig. 3, a rear view of the end post; Fig. 4, a detail of the staple.

Similar letters of reference indicate corresponding parts in all the figures where they occur.

A A, &c., are the fence-wires, either barbed or plain, of any suitable or desired number and any required distance apart, according to the height the fence is to be built and the purpose for which it is intended.

B are the intermediate posts, B' the corner-posts, and B² the end posts, of each section, where the securing of the wires is effected. On the corner-post are provided rollers or grooved pulleys C, which are held in staples $c'$, and the wires are run over these pulleys, as shown in the drawings, Fig. 1. The pulleys on the corner-post are placed in a position so that the wire shall bear directly and solely in their grooved peripheries, as shown. These pulleys are therefore placed with their axes in a vertical position, as shown.

On any desired number of intermediate planted posts pulleys or rollers $C^\times$, are provided, with their axes set in a horizontal position, so that the wires of the fence shall lie in the groove of the roller above the same. These pulleys $C^\times$ are held in place by means of a peculiarly-formed hook or part staple, D, which has one full limb, $d$, on the outer end of which the roller or pulley revolves, while the pointed end enters the post, a right-angle head or part, $d'$, of sufficient length to take in the half of the roller and allow space above it for the wire, and a part limb, $d^2$, bent at right angles to part $d'$ and of sufficient length to rest against the face of the post and confine the wire. This hook is driven in, as shown in Fig. 4, and forms a reliable holding means for both the roller and the wire.

The wires A A are passed through openings in the end posts, and at one end may be held by nails or pins let through loops in the wire. At the other end of the section tightening-rollers may be employed, as shown at L. The wires are wound round these rollers after passing through the post, and are tightened by turning the rollers. The rollers L are provided with annular ribs $l\ l$, which work in corresponding grooves in the posts, and are thereby held against endwise slipping. The space between the ribs affords, also, a confining drum or portion, on which the wire is to be wound and from which it cannot slip. A hole is formed through the roller at this point for the wire to pass through. Square or other non-circular formed heads $L^\times$ are made upon one end of the rollers, which can be taken hold of with a tool to turn the rollers. Openings $l^\times$ are made through one or both ends of the rollers, through which pins $l^2$ are passed to engage openings or notches in the post and prevent the rollers from turning when once fastened in this way.

Midway between the planted posts are placed stiffening posts or bars M, to support the wires at these points and prevent their sagging. These posts or braces M are preferably flat metallic pieces, as shown, applied to the wires edgewise. They have notches in one side, in which the wires rest, and are provided with binding-wires $m'$, which pass through openings in the bars M above the fence-wires, are bent back over said wires, and then carried forward and around the front edge or face of the bars, where they are twisted together or otherwise united. Thus is formed a complete tie or binder, which will hold the part M in its edgewise position and firmly bind the fence-wires to it. The intermediate post or bar, M, rests upon the surface of the ground or is supported upon some object to prevent it from sagging.

A brace, $b^\times$, placed at an angle of about forty-five degrees to the line of the fence, holds the corner-post in a reliably upright position, and a brace, $b^3$, secured to the end post, resting upon the ground at a point in line with the fence, has the fence-wires, one or more, fastened to it.

The end post, B², has a ground or bottom brace consisting of a strip or piece of material, N, resting upon the surface of the ground, one end being let into a notch or under-cut, $b^4$, in the post B², and the outer end of the said strip being connected to a point down the length of the post under the ground by a strap or brace, N'. This bracing means prevents the strain upon the post from causing it to give way or lean over, and makes the entire fence stiff and secure. In this end post and in any of the other posts, if desired, a cross-piece or anchor, O, is provided to further stiffen and sustain the post. This anchor-pin is placed at a point near the bottom or lower end of the post, so that a considerable weight of earth comes upon it.

Modifications within the scope of the improvement may be made without departing from the spirit or sacrificing the advantages of my invention.

The rollers or pulleys on the corner-posts may be secured by my peculiar form of hook or half-staple, as well as those on the intermediate posts.

The particular form of end roller may be substituted by some other form, or dispensed with altogether, and the wires fastened to this post in some suitable manner. The braces $b^\times$ and $b^3$ may be dispensed with.

Various other modifications may be made that will suggest themselves to those skilled in the art to which this invention appertains.

Having thus described my invention, what I desire to claim, and secure by Letters Patent, is—

1. The combination, with the fence-wires and supporting-posts therefor, of the end posts having a notch or cut-away portion at the surface of the ground, a strip or plate let into said notch or cut-away portion and extended out horizontally on the surface of the ground, and a strap tied over the end of said strip and to the bottom of the post, in the manner set forth, and an anchor or cross-piece in the bottom of said post, as set forth.

2. In a fence, the combination of the posts B B' B², the latter having the horizontal strip N and strap N' extending beneath the surface of the ground, the horizontal rollers C on the corner-posts, and the vertical rollers C× on the intermediate posts, said vertical rollers being held upon staples having one long limb and the other limb extending only to the surface of the post, wires A A A run over said rollers, the stretchers L on the end posts, constructed with the annular ribs, and the stiffening-bars M, applied edgewise to the fence-wires between the main posts, in the manner and for the purpose set forth.

In testimony whereof I affix my signature in presence of two witnesses.

SAMUEL P. ETTER.

Witnesses:
WM. R. BECK,
WM. F. PECK.